E. T. GANNERON.
MACHINE FOR HULLING RICE.
No. 65,480. Patented June 4, 1867.
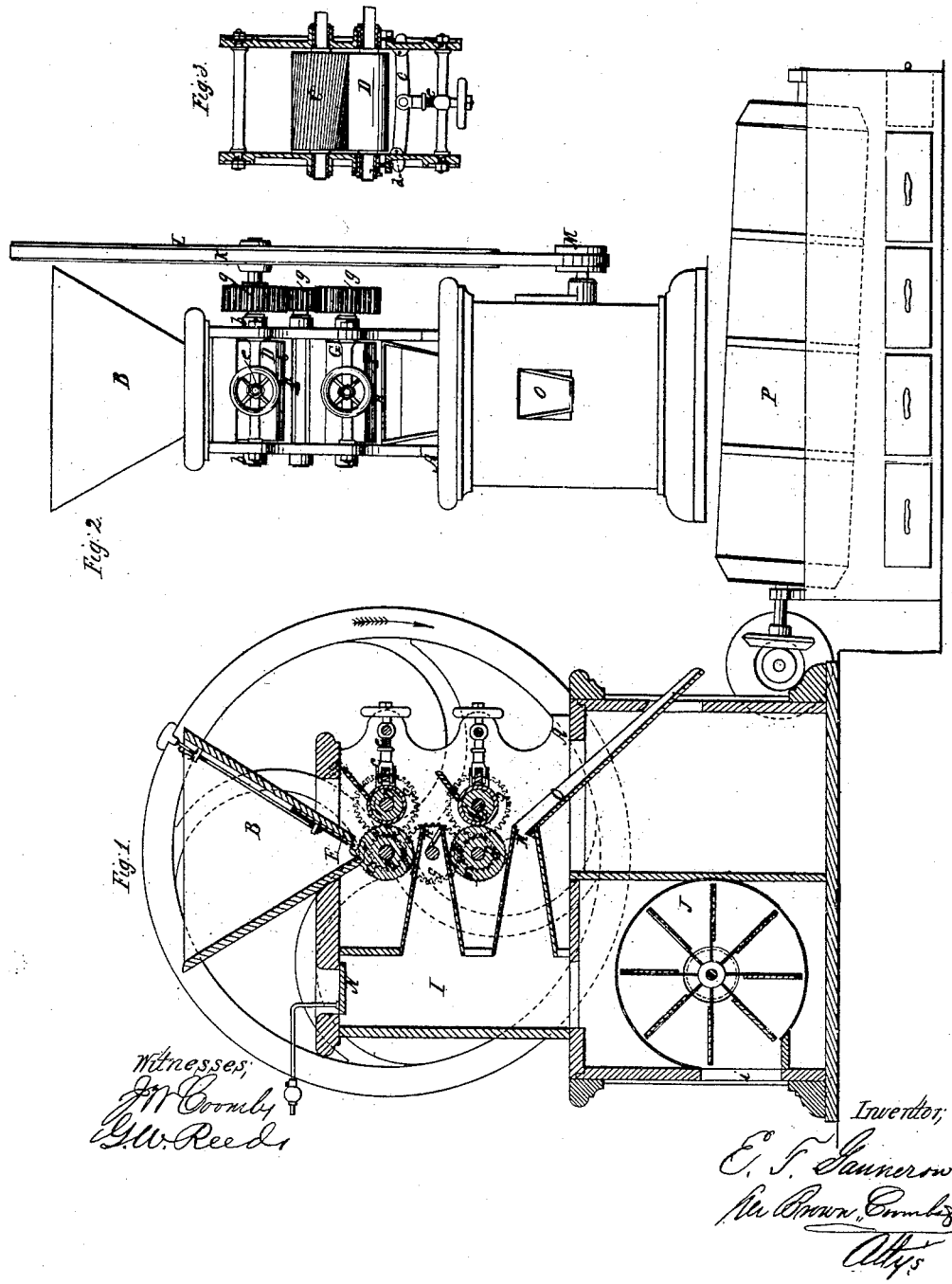

United States Patent Office.

EDMOND THEODORE GANNERON, OF PARIS, FRANCE.

Letters Patent No. 65,480, dated June 4, 1867.

IMPROVEMENT IN MACHINES FOR HULLING RICE.

The Schedule referred to in these Letters Patent and making part of the same.

I, EDMOND THEODORE GANNERON, of the city of Paris, in the Empire of France, have invented a certain new and useful Improvement in Machines for Hulling and Polishing Rice and other grain, of which the following is a full, clear, and exact description, reference being had to the accompanying drawing, forming part of this specification, and in which—

Figure 1 represents a vertical section of a machine constructed according to my improvement, with a separator shown in elevation attached.

Figure 2, an end view of the machine; and

Figure 3, a horizontal section through a pair of the hulling cylinders.

Like letters of reference indicate like parts throughout the several figures.

The nature of my invention consists in a novel combination, with the hulling and polishing cylinders, of a suction chamber and dust-clearing nozzles or passages for cleansing the grain and separating it from impurities.

Referring to the accompanying drawing, A represents the frame of the machine, which may be of any suitable description. B is a hopper, into which the rice or other grain to be passed through the machine is placed. Immediately below this hopper is arranged, with its axis in a horizontal position, a grooved metal cylinder, C, on to which the rice is delivered from the discharge aperture $a$ of the hopper. The grooves or flutes in the cylinder C may be of a ratchet-tooth form, and are preferably arranged to run spirally or obliquely along or on the periphery of the cylinder for operation in concert with a smaller cylinder, D, the periphery of which should be covered with India rubber or other soft material. These cylinders are made to revolve in reverse directions, as indicated by arrows in fig. 1, so as to carry and pass the rice in between them, which serves to abrade and crack off the hulls, the obliquity of the flutes in the one cylinder giving to said cylinder a drawing action, which more effectually detaches the hulls and prevents injury to the grain, the soft covering of the adjoining cylinder aiding the same. This latter cylinder is so hung in its frame as to be adjustable horizontally nearer to or further from its adjacent cylinder, to regulate their action to different sizes or qualities of grain. This may be done by making the bearings $b$ of said cylinder to slide in the frame which carries them, and so that they are under the control of a cross-bar, $c$, connected with them by plates or rods $d$, and governed by a central screw, $e$. To regulate the discharge from the hopper, I furnish the latter with a lateral or oblique slide, E, arranged on the interior of its front side or face, and adjustable by a screw, $f$, at top. A slide or valve thus arranged acts in a gradual and easy manner to regulate the discharge, and does not admit of piling or clogging. At a suitable distance below the cylinders C D is arranged a similar pair of cylinders, F G, operating in like manner as the upper pair, and the one, G, of which being similarly adjustable. This second pair of cylinders, and there may be any number of pairs in succession, one below the other, serves to hull any rice that may have escaped or have only been imperfectly subjected to the action of the upper pair of cylinders, and also serves to polish the hulled grain. And here it may be observed that the soft-faced cylinders in the several pairs should move at a less velocity than the fluted cylinders, as indicated by the gearing $g\ g\ g\ g$, by which they are or may be driven. Below each pair of fluted cylinders, and projecting so as to nearly intercept the rice in its descent, are dust-clearing nozzles or passages H, connecting in their rear with a suction-chamber, I, through which a draught is established or air exhausted by a fan or other blower, J, driven, it may be, by a belt, K, and pulleys L M, in such manner as that the current has its entry at the nozzles or dust passages H, and discharge at the outlet $i$ of the fan.

The amount of suction is or may be regulated without altering the velocity of the fan by a valve, N, at top of the chamber I, which, if the suction be excessive, opens and admits air, and which valve is made adjustable by a sliding weight on a lever connected with it, or by any other suitable means. By this arrangement the dust, husk, and other like particles or impurities, instead of being scattered to settle on the hulling cylinders and other working parts, are drawn into and collected within a covered chamber or box. The mouths of the nozzles or dust passages H may be provided with inclined stops $k$, to restrain any light grain from being drawn into the chamber I, and the cylinders D G may be similarly furnished with inclines over them to prevent scattering of the grain in its descent, and which may also serve to detach any matter adhering to said cylinders. The rice or other grain thus hulled and polished, may afterwards pass by a chute, O, to a cylindrical or other separator, P, divided into compartments, which are surrounded by screens of different sized mesh for separate delivery into drawers or boxes beneath of different sizes of grain.

What I claim as my invention, and desire to secure by Letters Patent, is—

1. The arrangement of the suction-chamber I and its nozzles or passages H with relation to the cylinders C D F G for operation, substantially as specified.

2. The valve N, in combination with the chamber I, for regulating the draught through the passages H without varying the velocity of the fan or other device producing the suction.

In testimony whereof I have signed my name to this specification before two subscribing witnesses.

EDM. GANNERON.

Witnesses:
   DUMAS,
   F. F. RANDOLPH.